Dec. 2, 1947.  R. A. BECKWITH  2,431,682
TANDEM BUCKET PAVING MACHINE
Filed May 11, 1944  9 Sheets-Sheet 1
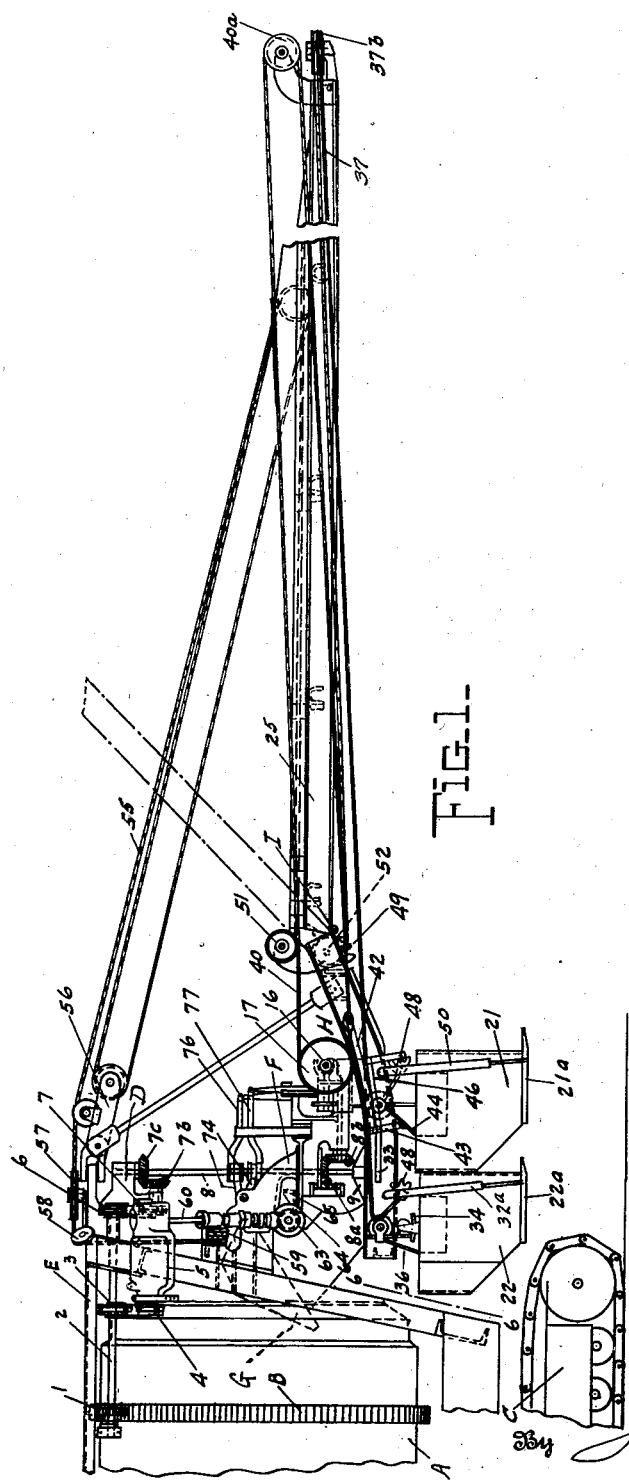
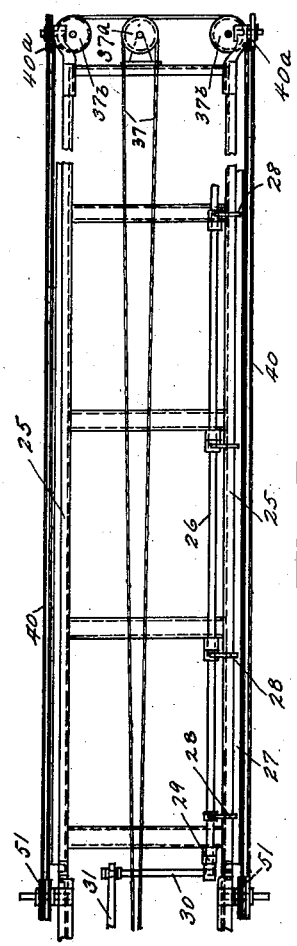
Inventor
R. A. Beckwith
By Robert Robb
Attorneys

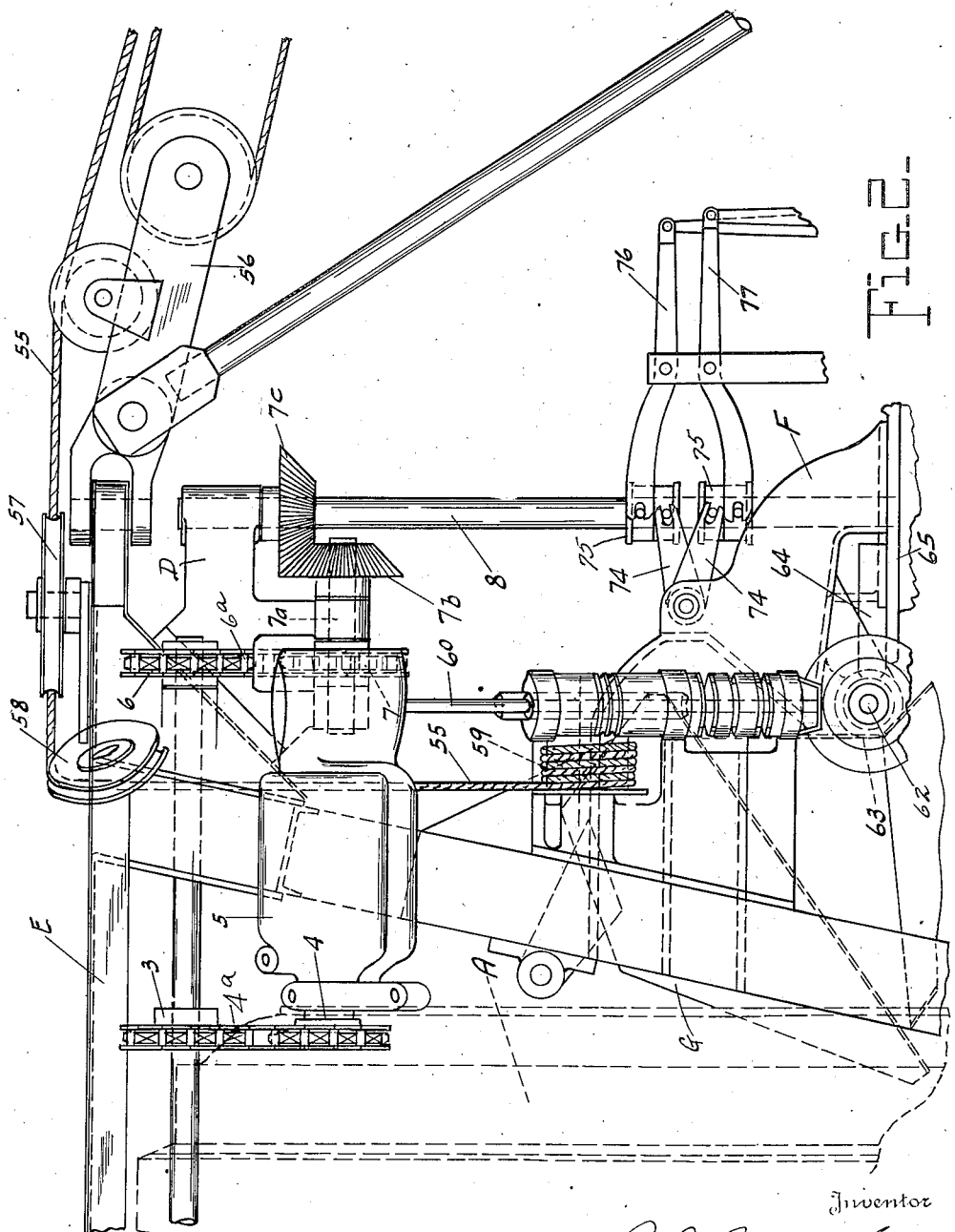

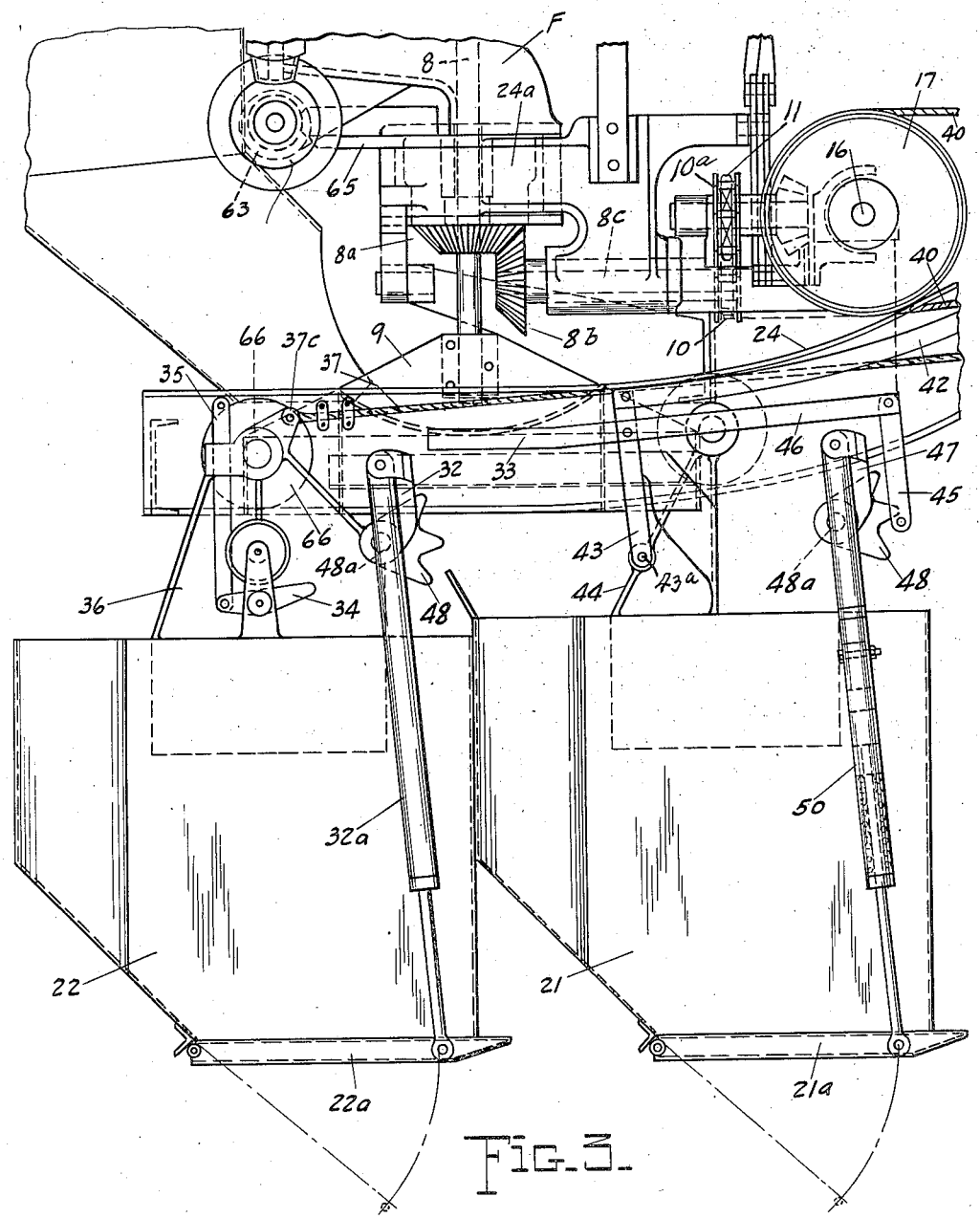

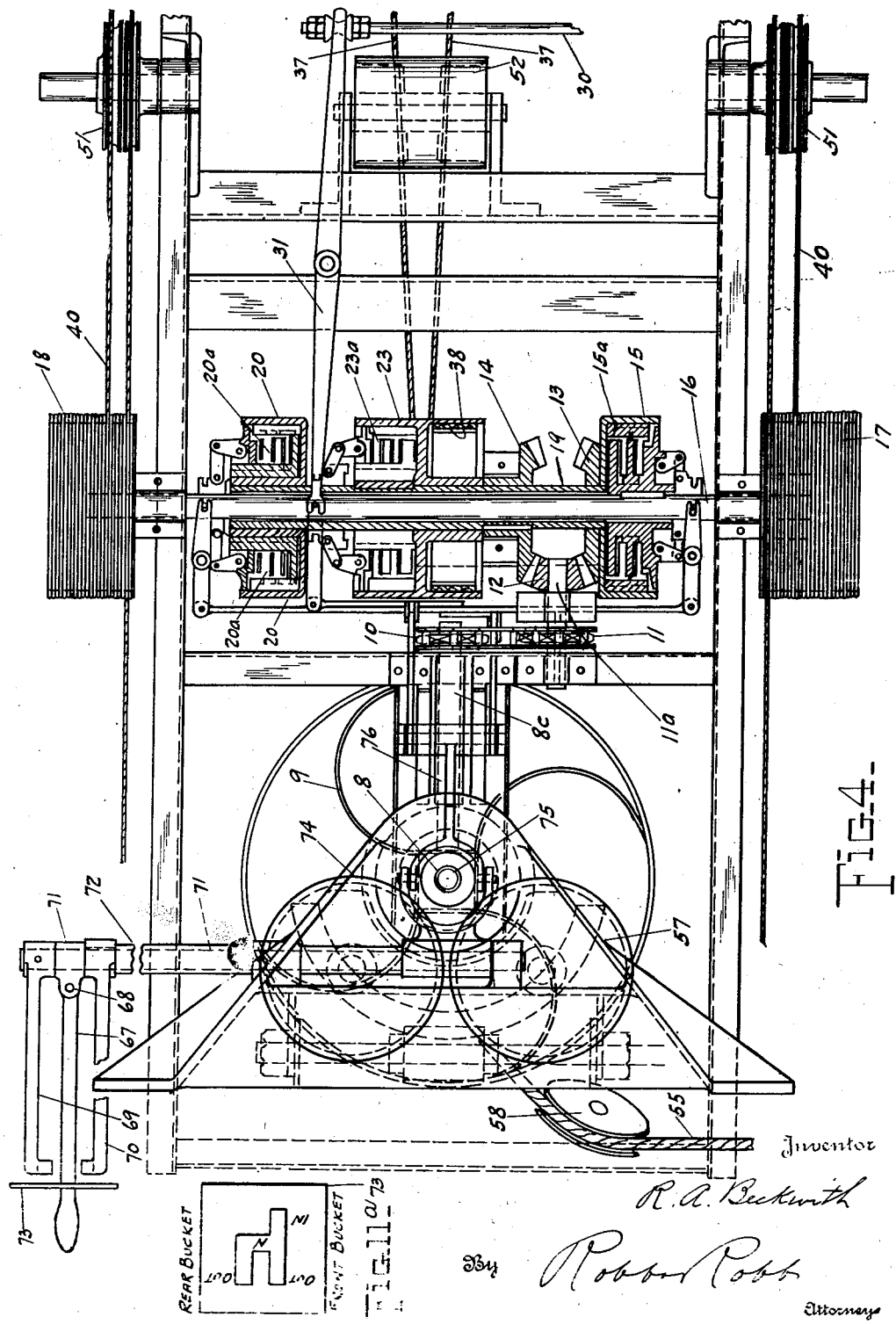

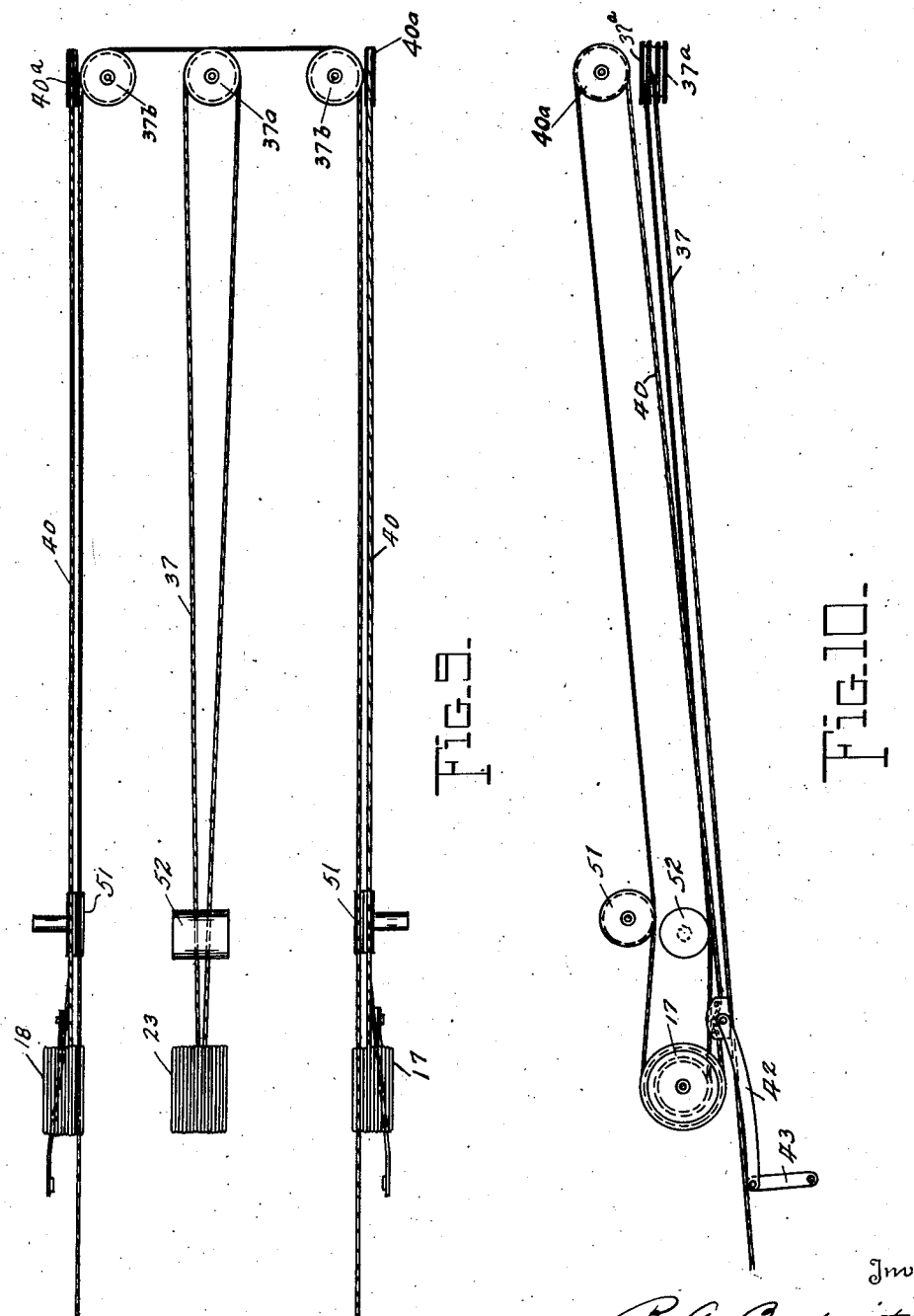

Dec. 2, 1947.   R. A. BECKWITH   2,431,682
TANDEM BUCKET PAVING MACHINE
Filed May 11, 1944   9 Sheets-Sheet 8
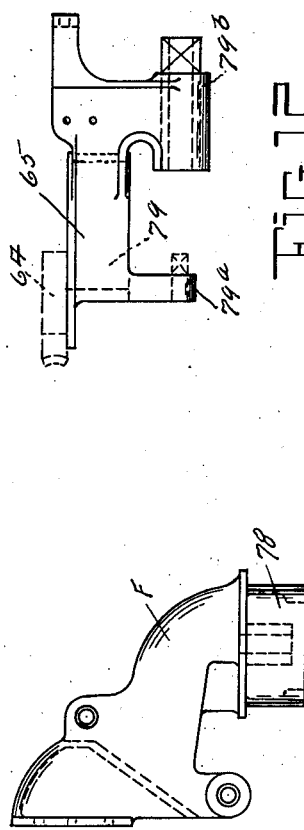
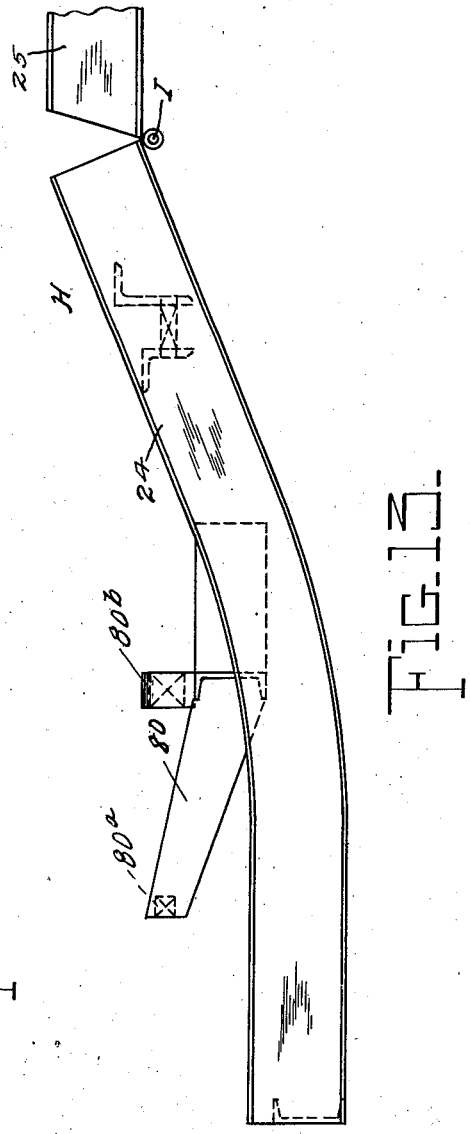
Inventor
R. A. Beckwith
By Robert Robb
Attorney Dec. 2, 1947.  R. A. BECKWITH  2,431,682
TANDEM BUCKET PAVING MACHINE
Filed May 11, 1944  9 Sheets-Sheet 9

INVENTOR.
R. A. Beckwith
BY Robb & Robb
Attorneys.

Patented Dec. 2, 1947

2,431,682

UNITED STATES PATENT OFFICE 2,431,682

TANDEM BUCKET PAVING MACHINE

Raymond A. Beckwith, Milwaukee, Wis., assignor to Koehring Company, Milwaukee, Wis., a corporation Application May 11, 1944, Serial No. 535,137

10 Claims. (Cl. 214—59)

This invention pertains to the art of concrete pavers or distributors of the type comprising a suitable portable base, a concrete mixing machine mounted thereon, and a boom and bucket distributor unit, the bucket of which traverses the boom when loaded from the mixer, toward the outer end of the boom to a dumping position at which the concrete conveyed thereby is deposited upon the subgrade to be paved.

Concrete paving machines of the above type are well known in the art, and typical constructions thereof are found in Lichtenberg Patent No. 1,141,470, issued June 1, 1915, and Tranaas Patent No. 1,824,580, issued September 22, 1931.

It is customary in the above class of paving machines for the entire batch of concrete in the mixing drum, or in one of two mixing drums when the machine is of the dual drum type, to be discharged into the conveyor bucket of the boom unit preliminary to the traversing of the bucket out on the boom. Since the cubical capacity of the mixing drums is very large, the weight of a batch of material received from the mixing drum, or one of the latter when two are used, by the bucket, is very great. The length of the distributing boom of machines of the prior type referred to is limited by the capacity of the distributing bucket, the weight of which when filled with concrete has a tendency to overturn the mixing machine, especially when the boom is adjusted in a position at right angles to the longitudinal axis of the machine or at an adjustment intermediate longitudinal alinement and transverse disposition of said boom.

The primary object of this invention, therefore, has been to provide a construction of paving machine of the general type referred to in which a double bucket or tandem bucket means are employed in lieu of the single distributing bucket heretofore used to travel along the boom of the boom and bucket unit. It is possible, by the use of the double bucket construction of this invention, to split the load of the mixed batch of materials, thereby substantially doubling the stability of the paving machine as respects the portable traction base and supported mixer as compared with that existing when a single bucket is employed and the boom is adjusted at right angles or nearly right angles to the highway or longitudinal axis of the machine.

In carrying out my invention, I utilize a generally novel cycle of operation of the boom and bucket mechanism. In the first place, I provide means to distribute the batch of mixed concrete discharged from the mixing drum substantially equally to the two distributing buckets of the boom, one of these buckets, the outer one, containing one-half of the normal drum batch being caused to traverse outwardly on the boom and dump to any predetermined position similar to practice heretofore used, as typified in the previously identified patents. Upon the dumping of this outer or first bucket, the second bucket, also containing about one-half of the normal batch mixed in the drum, will be caused to traverse outwardly on the boom until it reaches the outer or first bucket, at which position the dumping means of the second or inner bucket is tripped and its load is dumped. Thereupon, by the operation of suitable novel mechanism the outer bucket is returned to the mixer under power and is used to push the inner bucket ahead of it at the return traverse along the boom to the desired position of the buckets at the axis of the boom where they will again receive the divided mixed charge of aggregates from the mixing drum.

By reason of the employment of the two boom buckets referred to, it is obvious that only about one-half of the weight of the discharged batch is placed upon the boom in the traverse outwardly thereon of the buckets, this enabling, of course, the employment of a lighter and longer boom than has been heretofore utilized and affording to the improved stability of the machine, likewise previously referred to.

Another novel feature of my present invention lies in the design of the distributing boom of my machine, the same being constructed of an inner stationary and substantially horizontal section at the point of support of the boom unit, and a pivoted outer section of much greater length capable of being raised and lowered, raised to a relatively high angle to the horizontal, thus permitting of elevating the concrete distributed by the machine to a considerable height far greater than permissible in present standard types of machines like my invention, with the result that the buckets may discharge their aggregate to elevated places of deposit when building walls, elevated hoppers, or like structures.

A preferred embodiment of my invention is illustrated in the accompanying drawings, in which:

Figure 1 is a side elevation of a tandem bucket paving machine in a preferred form of the invention, dotted lines showing the angle to which the outer section of the boom may be elevated for supplying the concrete to elevated structures.

Figure 2 is an enlarged view of the superstructure portion of the paver carrying certain operating shafts and gearing and the vertical axis shaft for the swinging boom of the boom and bucket unit, many of the illustrated parts broken away because of limitations of space for illustration.

Figure 3 is a view of the tandem buckets and the inner end portion of the boom and adjacent parts below those which are illustrated in Figure 2, the buckets being shown in closed condition, dotted lines indicating the opening limit of the doors thereof and certain parts broken away because of limits of space.

Figure 4 is a top plan view showing primarily the vane distributor at the inner end of the boom, various clutch instrumentalities for controlling the operation of the cable and cable drum means for movement by power outwardly and inwardly of the outer bucket and movement by power outwardly only of the inner bucket, certain parts being broken away adjacent the point of pivotal connection of the boom sections.

Figure 5:
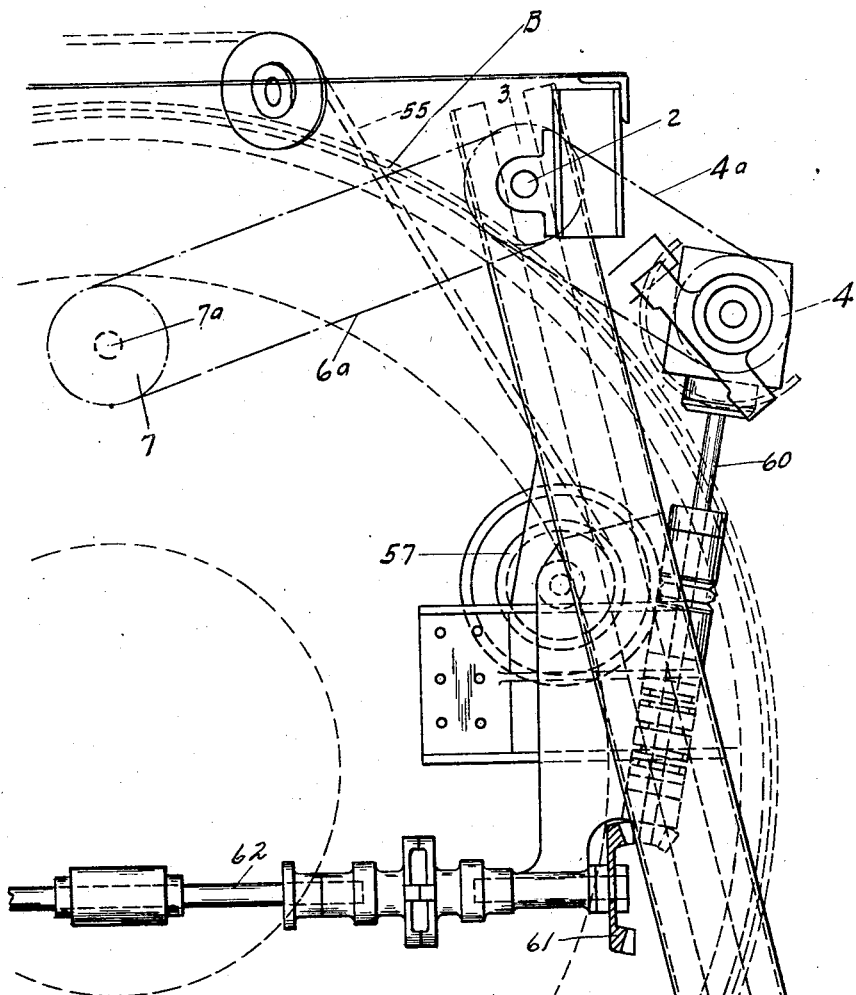

Figure 5 is a fragmentary view in elevation looking toward the discharge end of the mixing drum and illustrating certain of the drive gearing features of the invention.

Figure 6:
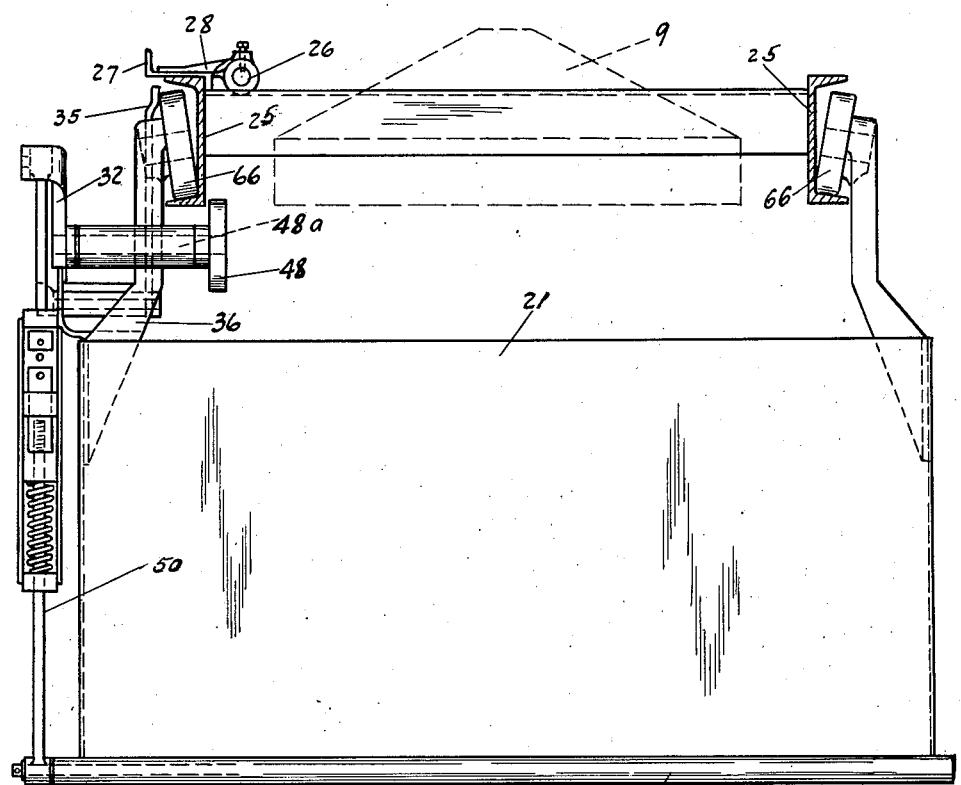

Figure 6 is a sectional view taken on Figure 1 illustrating bucket 21 on track section 25.

Figure 7:
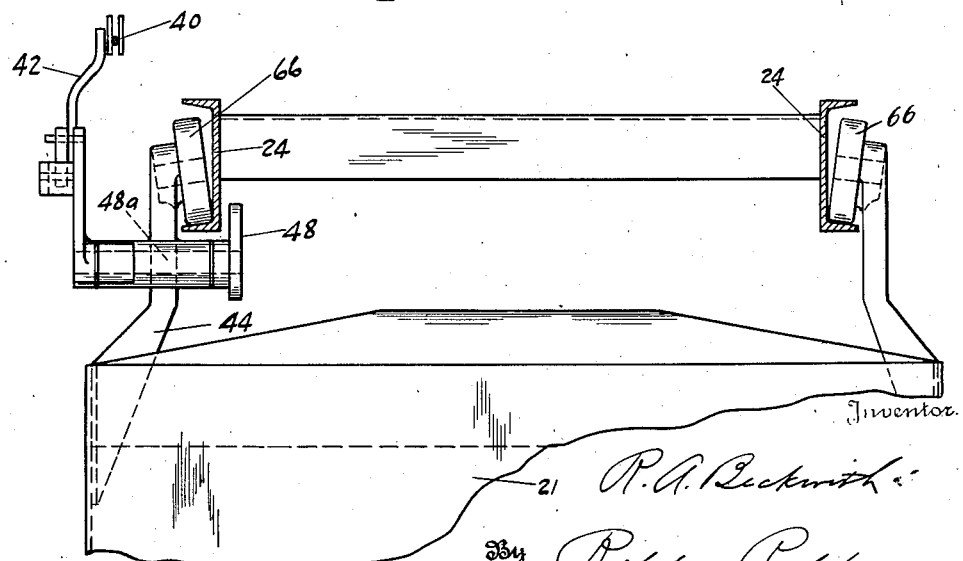

Figure 7 is a fragmentary sectional view taken on Figure 1 illustrating bucket 21 on track section 24.

Figure 8 is a fragmentary top plan view showing the inner end portion of the boom and certain of the manual operating lever means for controlling the clutch which energizes the cable operating devices for the inner and outer buckets.

Figure 9 is a diagrammatic view in top plan illustration of the cable and drum devices for operating the tandem buckets.

Figure 10 is a side view of said cable parts diagrammatically illustrated.

Figure 11a is a plan view of the indexing or control plate for the manual lever that controls operation of the buckets.

Figure 11 is a side view of the main boom supporting arm or bracket alone, the same supporting the clutch operating lever shaft and sleeve.

Figure 12 is a view of the boom swing bracket alone, same directly supporting the inner end of the main sectional boom.

Figure 13 is a fragmentary view of the inner end portion of the boom showing the pivot connection between the sections and showing the supporting bracket by which the inner section of the boom is connected to the boom swing bracket.

Figure 14:
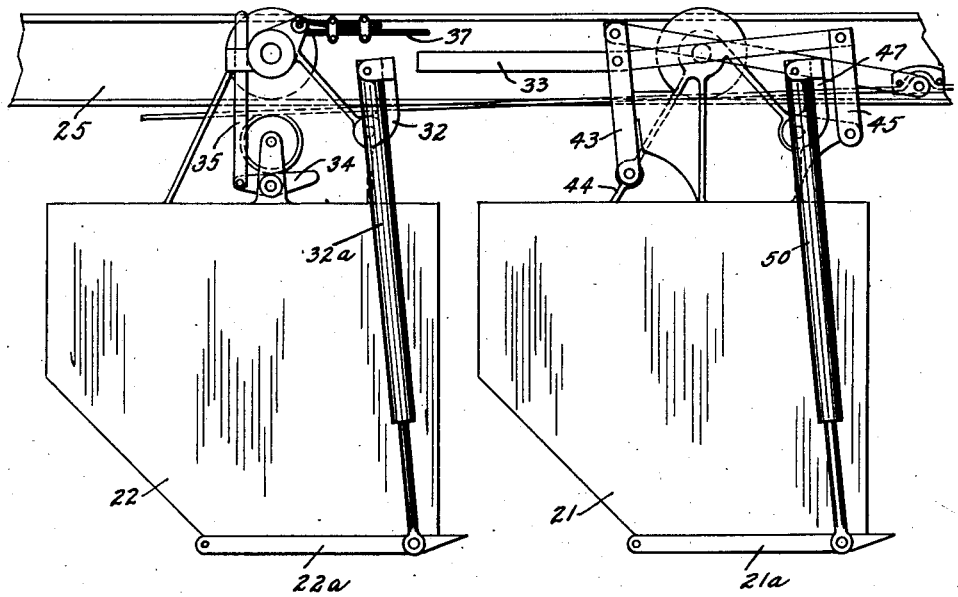

Figure 14 is a view in elevation, broken away at the ends, showing the disposition of the buckets, and operating parts associated therewith, when the buckets are on the straight part of the boom.

Figure 15:
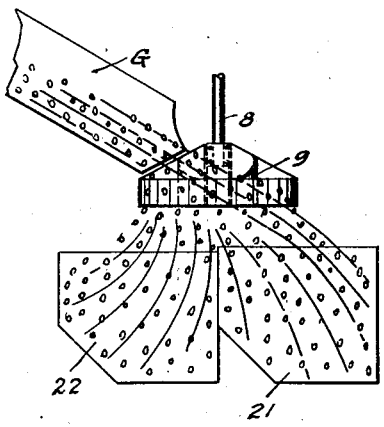

Figure 15 is a side view broken away, showing the discharge chute of the mixer, buckets, and distributor features, the distributing action of the distributor being depicted.

Figure 16:
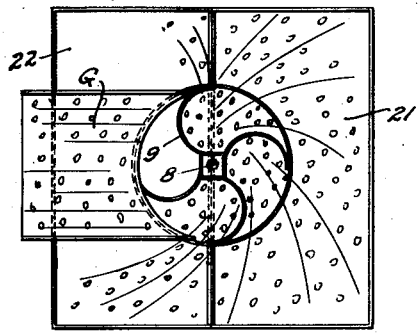

Figure 16 is a plan view of certain of the parts of Figure 15 also depicting the action of the distributor.

In the accompanying drawings, and describing the specific features of construction of my machine, A denotes a conventional mixing drum having a ring gear B engaging the spur gear 1 of a shaft 2 mounted in the superstructure framework of the paving machine, said framework carried by the customary traction base C. The gear 1 drives the shaft 2 during the operation of the mixing drum A, and on the shaft 2 is a sprocket gear 3 connected by a sprocket chain 4a to a sprocket 4 for driving gearing in a gear box 5, to be later further referred to. Also carried by the shaft 2 is a second sprocket 6 connected by a sprocket chain 6a to a sprocket 7 on a shaft 7a disposed in a vertical plane about centrally of the axis of the drum A and extending outwardly in the direction of the boom and bucket unit. The shaft 7a is connected by bevel pinions 7b and 7c with a vertical driving shaft 8 supported at its upper end in a bearing in an offstanding arm D of the superstructure frame E of the paver. This shaft 8 is supported also at its lower portion by means of a lower offstanding arm F attached to the framework E, and the shaft 8 is constantly driven through the gearing previously mentioned from the shaft 2.

At its lower end and some distance below the bracket F the shaft 8 has keyed or otherwise fastened thereto a rotative vane distributing wheel or member onto which the batch of mixed materials from the drum A is directed by the discharge chute G of said drum, the latter being of usual construction and customarily power driven.

The purpose of the distributor 9 is to spread or distribute about equally between the tandem buckets 21 and 22, later referred to as disposed beneath this distributor in the filling of these buckets by the batch of mixed material preparatory to the conveying of the buckets and their contents to the place of deposit of the mixed materials, by traversing movement along the boom.

Near its lower end the shaft 8 carries a bevel pinion 8a engaging the pinion 8b of an outwardly extending short driven shaft 8c, and said shaft 8c carries a sprocket gear 10 connected by a sprocket chain 10a with a sprocket 11, whereby to transmit the drive of the shaft 8 to the shaft 8c and thence to a countershaft 11a on which sprocket 11 is keyed. The shaft 11a carries a bevel pinion 12 which meshes with bevel gears 13 and 14 driving the latter in opposite directions. A clutch housing 15 is fastened to the gear 13 and by engaging the clutch 15a in said housing the rotation of the housing by the bevel gear 13 will be transmitted to the drum shaft 16 which extends crosswise of the boom, which is generally designated at H, near the inner end of the boom. The drum shaft 16 carries cable drums 17 and 18 which, when turned counterclockwise by the use of the clutch means 15 and 15a, will move the front or outer bucket 21 outwardly on the boom H. The previously mentioned bevel gear 14 is keyed to a sleeve 19 on the shaft 16, and this sleeve carries at its outer end a clutch housing 20 cooperative with the clutch means 20a therein to drivingly connect under manual control the gear 14 with the shaft 16 to turn the shaft 16 in a clockwise direction, under which conditions the outer or front bucket 21 will be moved inwardly on the boom H toward the mixer A. The drums 17 and 18 are connected to the bucket 21 through cable provisions shortly to be described.

Keyed to the sleeve 19 about at the middle relatively to the shaft 16 and inside of a cable drum 23 surrounding said shaft and otherwise loosely turning on the sleeve 19 is a clutch 23a for transmitting turning motion of the sleeve 19 to the drum 23 under suitable manual control of the clutch means 23a. The drum 23 has two cables 37 wrapping clockwise thereabout, and the outer ends of the cables 37 pass around sheaves 37a at the outer end of the boom H, and, running in opposite directions from the sheaves 37a, pass about the sheaves 37b and thence back along the boom at its opposite sides to points of connection with the opposite sides of the inner bucket supporting means at 37c, as more particularly described later.

The cables 40 located with their bights in a vertical plane and disposed at the outer sides of the boom H are endless cables connected with the respective drums 17, 18 for moving the outer bucket 21 inwardly and outwardly under power. Said cables are attached to the outer bucket, and operation of the clutch means 15a and 20a, as previously described, under manual control will effect reverse movements of the cables 40 for the purpose mentioned. Suitable sheaves or pulleys 40a at the outer end of the boom H and opposite sides thereof guide the cables 40 at these points, and fleeting sheaves 51 engage the upper laps of the cables near the drum shaft 16, and other fleeting sheaves 52 engage the lower laps of the cables 40 near the location of the sheaves 51.

The boom H comprises side structural members preferably channels or the like and said boom includes two main parts, an inner stationary track section 24 and an outer pivoted and variably inclinable track section 25. The relatively stationary section 24 is made up of two curved side members having supporting means including suitable bracket F for supporting the shaft 16. The bracket means F provides a bearing for the vertical shaft 8 at the lower end of the latter so that said shaft forms a vertical axis about which the boom H as a complete unit may be swung horizontally. The boom H may be tilted sidewise to compensate for any elevation in the roadbed on curves.

The inclinable or pivotal section 25 of the boom H is hinged to the section 24 at opposite sides of the boom sections as at the points I and thus may be raised or lowered by suitable mechanism very similar to that heretofore employed for raising and lowering single boom type distributing units, said mechanism to be more fully described hereinafter.

Carried by the boom H at one side thereof, see Figures 1, 6 and 8, in an angle plate 27 supported by arms 28 on a shaft 26, in turn mounted in suitable bearings in crosspieces or members connecting the structural side members of the boom H. The angle plate 27 is of considerable length extending from the inner end of the inclinable section 25 of the boom to a point a short distance from the outer end of said section.

On the inner end of the shaft 26 is a lever arm 29 connected by a link 30 to a clutch throw out lever 31 which operates the clutch means 23a inside the cable drum 23. The parts just last described comprise a clutch knock-out mechanism designed to discontinue the outward movement of the inner bucket 22 when said bucket reaches its outer limit of movement at the inner side of the outer bucket and its discharge door 22a is opened to discharge the contents of the bucket 22.

Describing the clutch knock-out mechanism last referred to somewhat more fully, assuming that the outer bucket 21 has been caused to traverse the boom H to a suitable point of discharge in the length of the boom, said bucket 21 will be stationary. Then, when the bucket 22 is caused to pass outwardly on the boom, when it reaches the bucket 21, the over dead center crank arm 32 connected by the rod 32a to the door 22a will be opened by striking the inner end 33 of a link 46 which is mounted on the front bucket 21. In this manner the upper end of the arm 32 is carried over the dead center and swings leftwardly downwardly as the door 22a opens. In this swinging movement the arm 32 hits a lever 34 on the bucket 22 and thereby raises a vertically movable actuating bar 35 sliding on the roller bracket of the bucket 22. The raising movement of the actuating bar 35 causes it to strike the plate or angle 27 rocking the angle upwardly and thereby rocking the shaft 26 thus to actuate the parts 29, 30, and 31 to throw out the clutch means 23a and bring the bucket 22 to a stop. The parts 34 and 35 are mounted on the roller carrier or bracket 36 of the bucket 22.

Since the bucket 22 moves by power in the outward or forward direction only, a means has to be provided to keep the cables 37 taut at all times and such means comprise a drag brake 38 inside the drum 23 that is connected with the cable 37.

Figure 1 and Figure 10 show how the cables 40 which are anchored in the drums 17 and 18 are connected by links 42 to pivots in the upper end of levers 43, in turn pivoted at 43a to the roller carriers or brackets 44 of the bucket 21. A pivoted arm 45 on the roller carrier 44 is also pivotally connected at its upper end by link 46 with the lever 43.

Upon engagement of the clutch means 15a, the cables 40 are operated to pull outwardly on the links 42, and the levers 43 at opposite sides of the bucket and roller carrier 44 engage a protrusion or abutment on the carrier 44 and cause the bucket 21 to be pulled outwardly by the movement of said cables. As is a similar practice in present types of boom and bucket paving machines, upon reversal of movement of the cables 40 by use of the clutch means 20a, the cables 40 will cause the links 45 to contact with the over dead center crank arm 47 connected by the linkage 50 to the door 21a of the bucket 21. This striking action of the member 45 against the arm 47 throws the latter over its dead center position and enables the door 21a to open and discharge the bucket 21.

For closing of the buckets on their simultaneous empty return trip to the drum of the mixer, there are provided toothed segments 48 on the axes 48a of the dead center arms 47 and 32 of the respective outer and inner buckets 21 and 22. These toothed segments are of course upraised by the throw-over action of the dead center arms in opening the doors 21a and 22a. Therefore when the two empty buckets 21 and 22 return to the inner end of the boom H after depositing their contents on the subgrade, the toothed segments 48 of the inner and outer buckets in consecutive order will engage a toothed rack member 49 on the inner section 24 of the boom H and by such engagement a clockwise rotary motion of the segments will be created, thus carrying the arms 47 and 32 in a clockwise return direction to raise the doors of the buckets and lock them by the arms being shifted to their rightward over dead center position respecting the axes 48a.

With the mechanism of the invention as thus far described in reference to all main and essential features thereof, the general operation of the tandem bucket distributing boom unit will be set forth.

By control of the clutch means 15a, the lower laps of the cables 40 are caused to pull outwardly on the links 42 to carry the filled outer bucket 21 outwardly on the boom H to the place where it is to be emptied for deposit of its contents. The clutch means 20a is then operated to reverse the movement of the cable means 40 and this will dump the bucket 21 in the manner previously described by action of the bottom door of said bucket. Half the mixed charge of the drum A is thus deposited on the subgrade.

Next, by operation of the clutch means 23a manually, the operator will cause the inner bucket 22, previously filled with concrete aggregates, to move outwardly on the boom H until its bucket door holding and closing arm 32 strikes the member 33 of the bucket 21, thereby tilting the arm 32 and permitting the door 22a of bucket 22 to open and discharge the bucket. Of course, when the bucket door 22a opened, the arm 32 struck the lever 34, raised the actuating bar 35, and operated the clutch means 20a to release these clutch means and stop the outward movement of the bucket 22, simultaneously with its discharge and previously to any impacting action of the bucket 22 against the bucket 21.

The clutch means 20a may again be thrown in, this time to remain clutched for bringing the outer bucket back to its position for loading at the mixing drum. In this action the cables 40 exert an inward pushing force on the links 42 connected with the bucket 21 and the bucket 21 exerts a pushing force against the outer side of the bucket 22 so that both buckets move back to the mixing drum simultaneously. Upon reaching the proper position adjacent the mixing drum, the operator will release the clutch means 20a and permit stopping movement of the buckets in their inward traverse on the boom H.

The boom H, being made of two sections, it is possible to elevate the outer section 25 by movement about its pivotal axes I through means of boom raising cable instrumentalities 55 which are anchored to the superstructure frame B as at 56, the cable means passing around a sheave on the outer end of the boom, sheaves at the anchoring means 56, a guide sheave 57, a second guide sheave 58, to a winding drum 59.

Irrespective of the inclination of the boom section 25 relatively to the boom section 24, the buckets 21 and 22 may be caused to travel along the boom from the inner to the outer end thereof.

Respecting certain details of construction that may be employed, it is apparent from Figure 1 of the drawings that from the gearing of the housing 5 a vertical shaft 60 carries the drive to the drum 59 and the lower end of said shaft 60 is connected by bevel gears 61 to a horizontal shaft 62 which supports a worm gear 63 engaging an arc-shaped rack 64 on a bracket 65 at the inner end of the boom H. The operation of the shaft 60 under manual control may be used, therefore, to swing the boom H horizontally and this operation is known in the art. The boom swings about the shaft 8 as an axis, as indicated previously.

When the outer boom member or section 25 is raised from the position of Figure 1 in full lines to an upward position as illustrated brokenly in dotted lines in said figure, the sheaves 51 mounted on the boom section 24 contact with the cables 40 and take up the resultant slack therein due to decreasing the center distance between the sheaves 41 and the cable drums 17 and 18. An idler roller 52 near the outer end of the boom section 24 prevents the cable parts 37 from contacting with the cross members of the boom. The rollers 66 on the roller carriers 36 and 44 travel, of course, in the channel portions of the side structural members of the boom sections 24 and 25. They pass over the hinge member I as they move from the section 24 to the section 25 of the boom.

As previously indicated, any suitable manual instrumentalities may be utilized for controlling the several clutch means 15a, 23a and 20a. As illustrated, said clutches are controlled from a lever 67 swingable in a plane longitudinal of and parallel to the boom and shiftable rectilinearly to such plane about a pivot 68. The lever 67 is engageable by outward lateral movement with a throw arm 69 and by inward lateral movement with a throw arm 70. The arm 69 is mounted on an inner solid shaft 71 and the arm 70 is mounted on a hollow shaft 72 in which the shaft 71 is received. The positions of the lever 67 are indicated upon a slotted plate 73 through which the lever handle passes and by proper manipulation of the lever from a neutral position outwardly and rearwardly it may be engaged with the arm 69 to effect an outhaul or movement of the inner bucket 22. Shifting the lever 67 across neutral in an opposite direction, and rearwardly, will cause the proper clutch means to move the outer bucket 21 outwardly on the boom and an opposite or rearward movement of the lever 67 when so adjusted will cause the inward movement of the bucket 21 on the boom, which movement of course simultaneously brings the bucket 22 back to charging position near the mixer by pushing action previously described.

Figure 1 discloses that the shafts 71 and 72 are mounted on the bracket F and are equipped with suitable yokes 74 engaging the throw sleeves 75 on the shaft 8, one sleeve 75 connected by a lever 76 to suitable linkage leading to the operating clutch for causing outward movement of the inner bucket and a second lever 77 being connected by suitable linkage and lever parts to the clutches that control the outward pull or traverse of the bucket 21 along the boom, and the return traverse thereof.

As apparent from the drawings, Figures 2, and 11 to 13 inclusive, the main supporting arm or bracket F at its lower portion 78 is adapted to be received in the socket portion 79 at the left upper part of the swing bracket 65, see Figure 12. This affords a vertical axis for the horizontal swinging of the boom unit H. In turn the boom unit H is equipped on the inner section 24 thereof with a special bracket 80 adapted at its portions 80a and 80b to be connected by horizontal pivot pins or pintles with the portions 79a and 79b, respectively, of the bracket 65. This construction affords a longitudinal horizontal axis connection between the boom unit H and bracket 65. Such construction is advantageous in that even if the traction base C of the machine is not horizontal transversely, the boom and buckets unit will be properly positioned in virtual suspension from the bracket 65, the boom unit H being self-adjusting to the above extent. Summarizing, therefore, the boom H swings horizontally about the axis of the parts 78 and 79 as a vertical axis, may swing transversely to such axis about the pivotal axis established by the parts 80a and 80b, and 79a and 79b, and the outer section 25 of the boom unit H may swing vertically about the axis I connecting the sections 24 and 25.

Having thus described my invention, what I claim as new and desire to secure by Letters Patent of the United States, is:

1. In a concrete distributing machine of the class described, in combination, a materials discharge device, a boom and bucket unit extending from the discharge device, tandem buckets movable in the same line of movement on the boom of said unit, operating mechanism for causing independent travel movement of the buckets in alinement outwardly on said boom, and a distributor intermediate the discharge device and the said buckets for dividing the aggregates discharged from the discharge device to cause passage of the same to both of the buckets.

2. A machine as claimed in claim 1, combined with a driven shaft constituting a vertical pivotal axis for the boom and bucket unit, and an operating connection between said shaft and the distributor.

3. A machine as claimed in claim 1, combined with a driven shaft constituting a vertical pivotal axis for the boom and bucket unit, and an operating connection between said shaft and the distributor, the operating mechanism for the buckets including instrumentalities connected with said shaft.

4. A boom and bucket unit for concrete paving machines, comprising a support, a boom extending from the support and movably mounted upon the latter, tandem inner and outer buckets arranged to travel from a normal loading position in which they are carried by the boom to an outward discharging position and thence to return to their loading position, discharging means for each bucket, said buckets disposed in inward and outward alinement with each other to travel in the same line of movement on the boom, and means to move said buckets inwardly and outwardly on the boom.

5. A boom and bucket unit for concrete paving machines, comprising a support, a boom extending from the support and movably mounted upon the latter, tandem inner and outer buckets arranged to travel from a normal loading position in which they are carried by the boom to an outward discharging position and thence to return to their loading position, discharging means for each bucket, said buckets disposed in inward and outward alinement with each other to travel in the same line of movement on the boom, and means to move said buckets inwardly and outwardly on the boom, separately in an outward direction, and to cause engagement of the outer bucket with the inner bucket to effect inward movement of the latter.

6. A boom and bucket unit for concrete paving machines, comprising a support, a boom extending from the support and movably mounted upon the latter, tandem inner and outer buckets arranged to travel from a normal loading position in which they are carried by the boom to an outward discharging position and thence to return to their loading position, discharging means for each bucket, said buckets disposed in inward and outward alinement with each other to travel in the same line of movement on the boom, means to move said buckets inwardly and outwardly on the boom, and means on the outer bucket to trip the discharge means for the inner bucket.

7. A boom and bucket unit for concrete paving machines, comprising a support, a boom extending from the support and movably mounted upon the latter, tandem inner and outer buckets arranged to travel from a normal loading position in which they are carried by the boom to an outward discharging position and thence to return to their loading position, discharging means for each bucket, said buckets disposed in inward and outward alinement with each other to travel in the same line of movement on the boom, and means to move said buckets inwardly and outwardly on the boom operable to effect independent outward movement of the buckets on the boom and compel simultaneous inward movement of said buckets.

8. A boom and bucket unit for concrete paving machines, comprising a support, a boom extending from the support and movably mounted upon the latter, tandem inner and outer buckets arranged to travel from a normal loading position in which they are carried by the boom to an outward discharging position and thence to return to their loading position, discharging means for each bucket, operating means for causing independent movement of the buckets on the boom from the loading position to the discharging position, and including means for effecting simultaneous movement of the buckets to return them to their loading position, combined with operating means for the discharging means of the outer bucket, and instrumentalities intermediate the outer bucket and inner bucket for operating the means of discharging the latter bucket, comprising parts on both buckets contacting one another as the inner bucket reaches a discharging position substantially engaging or contacting the outer bucket.

9. In a boom and bucket distributing unit for concrete mixing machines, in combination, a support, a boom mounted on said support for movement relative thereto, tandem buckets mounted on the boom to traverse the same longitudinally from an inner loading position to an outer discharging position, operating mechanism for effecting movement of one first bucket outwardly on the boom and controlling discharge action of said bucket, operating means for the second bucket for moving same from its loading position to a discharging position on the boom independently of the movement of the first bucket, and means for automatically discharging the second bucket when it reaches a position adjacent to the discharge position of the first mentioned bucket, the last means including instrumentalities on the first mentioned bucket for impinging and operating the discharge mechanism of the second mentioned bucket to effect discharging action of the latter.

10. In a boom and bucket distributing unit for concrete mixing machines, in combination, a support, a boom mounted on said support for movement relative thereto, tandem buckets mounted on the boom to traverse the same longitudinally from an inner loading position to an outer discharging position, operating mechanism for effecting movement of one first bucket outwardly on the boom and controlling discharge action of said bucket, operating means for the second bucket for moving same from its loading position to a discharging position on the boom independently of the movement of the first bucket, and means for automatically discharging the second bucket when it reaches a position adjacent to the discharge position of the first mentioned bucket, comprising control means on the second mentioned bucket engageable with means on the first bucket at the discharge position of the latter to discharge the second bucket, and in which the operating mechanism for the buckets is operable to simultaneously return the buckets to their loading positions.

RAYMOND A. BECKWITH.

REFERENCES CITED

The following references are of record in the file of this patent:

UNITED STATES PATENTS

| Number | Name | Date |
| --- | --- | --- |
| 542,375 | Scoles | July 9, 1895 |
| 1,085,032 | Gogarty | Jan. 20, 1914 |
| 1,169,234 | Bunnell | Jan. 25, 1916 |
| 1,468,472 | Heine | Sept. 18, 1923 |
| 1,550,748 | Robb | Aug. 25, 1925 |
| 1,566,493 | McKay | Dec. 22, 1925 |
| 1,590,866 | Teske | June 29, 1926 |
| 1,693,198 | Everist | Nov. 27, 1928 |
| 1,749,230 | Rosendahl | Mar. 4, 1930 |
| 1,827,527 | Koehring | Oct. 13, 1931 |
| 2,042,388 | Cogito et al. | May 26, 1936 |
| 2,074,073 | Robinson et al. | Mar. 16, 1937 |
| 2,189,018 | Robinson | Feb. 6, 1940 |
| 2,205,155 | Reed | June 18, 1940 |
| 2,319,807 | Farrell | May 25, 1943 |